Feb. 16, 1943.  R. W. ANDREASSON  2,311,198
JAR CLOSURE
Filed July 3, 1940

INVENTOR
Rudolf W. Andreasson
BY
ATTORNEY

Patented Feb. 16, 1943

2,311,198

UNITED STATES PATENT OFFICE 2,311,198

JAR CLOSURE

Rudolf W. Andreasson, Detroit, Mich.

Application July 3, 1940, Serial No. 343,829

3 Claims. (Cl. 215—83)

This invention relates to jar closures particularly adapted to threaded fruit jars or fruit jars formed with bayonet cleats to engage complementarily formed fruit jar covers.

One object of the invention is to provide a quick sealing and quick opening closure for fruit jars and the like which employs inexpensive replaceable sanitary sealing discs.

Another object of the invention is to provide a quick sealing and quick opening closure for fruit jars and the like which seals the jar around its upper annular end against a replaceable sanitary sealing disc whereby to prevent the contents thereof from leaking and sticking between the jar and the other elements of the closure means.

A further object of the invention is to provide a sturdy, easily manufactured re-usable closure means for fruit jars which employs a replaceable sanitary sealing disc and a resilient pressure disc and which includes means by which sealing pressure is applied uniformly through the said pressure disc between the annular end of the fruit jar and the said replaceable sanitary sealing disc.

Other objects of the invention will become apparent by reference to the following detailed description taken in connection with the accompanying drawing, in which.

Figure 1:
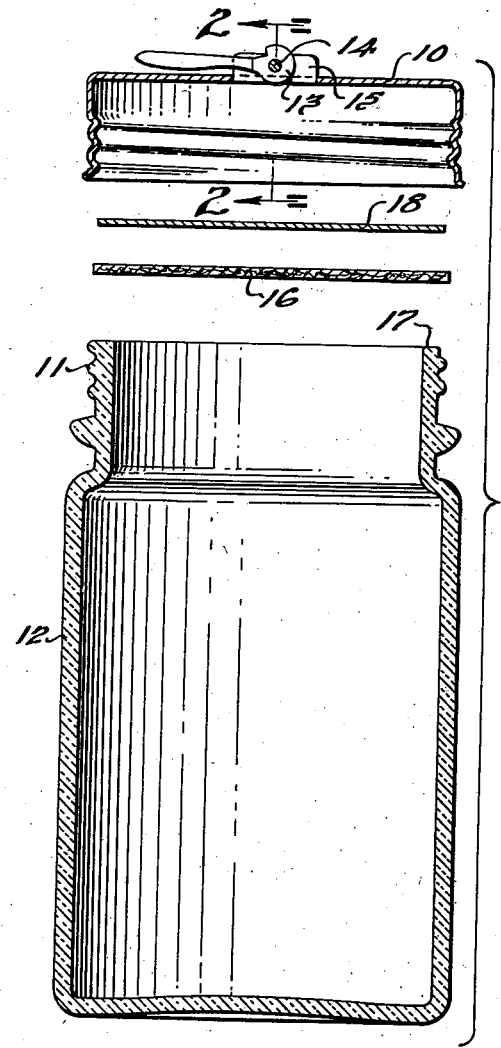
Fig. 1 is an exploded vertical sectional view of a jar closure embodying the invention shown in conjunction with a large mouth threaded neck fruit jar.
Figure 2:
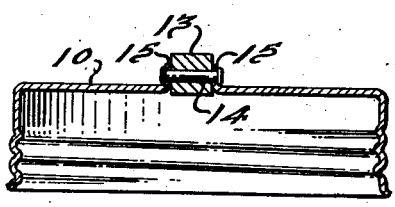
Fig. 2 is a vertical sectional view taken on the line 2—2 of Fig. 1 showing the cam pressure applying means preferably employed to apply pressure to the sanitary sealing disc through the resilient pressure disc.

Referring now to the drawing wherein like numerals refer to like and corresponding parts throughout the several views, the illustrative embodiment of the fruit jar closure means disclosed comprises a threaded fruit jar cover 10 which may be turned onto the open complementarily threaded end 11 of a fruit jar or the like 12. The top of the fruit jar cover 10 is preferably provided with a cam 13 pivoted at the center thereof on a suitable rivet or like pivot 14 extending through and between lugs 15 struck up from the top of the said fruit jar cover 10. The said cam 13 is so formed as to be flush with the underside of the top of the said fruit jar cover 10 when the lever handle thereof is in the position shown in Fig. 1 and to extend below the underside of the said fruit jar cover 10 when the lever handle thereof is rotated 180 degrees about its pivot 14 to a position opposite the first-named position.

Figure 3:
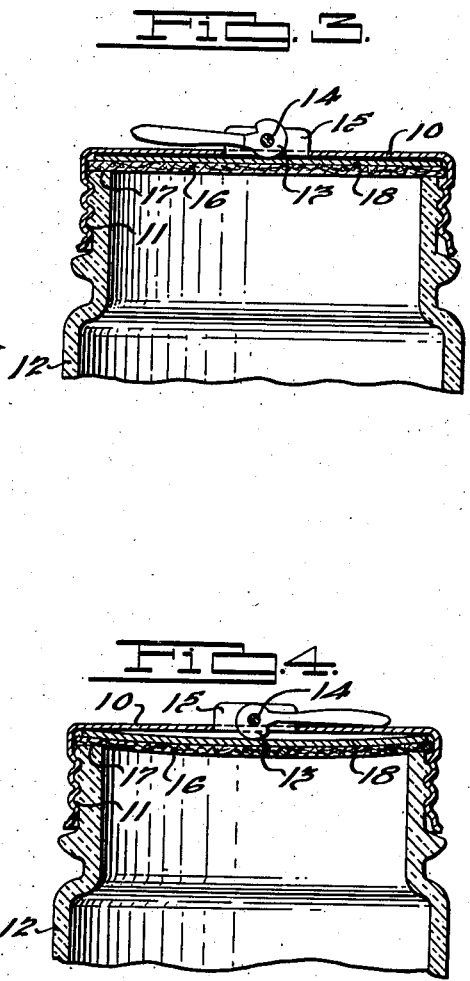
Fig. 3 is a vertical sectional view of the jar closure means disclosed in Fig. 1 threaded onto a threaded neck fruit jar with the cam pressure applying means thereof shown in a released position.

A replaceable wax paper sanitary sealing disc 16 is placed over the upper annular end 17 of the fruit jar 12, a resilient metal pressure disc 18 is placed concentrically over the said sanitary sealing disc 16, and the threaded fruit jar cover 10 is turned onto the complementarily threaded end 11 of the said fruit jar 12 into engagement therewith to the position shown in Fig. 3.

Figure 4:
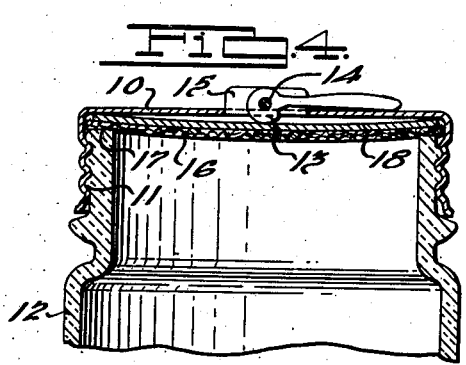
Fig. 4 is a vertical sectional view similar to Fig. 3 except that the cam pressure applying means is shown in its sealed position urging the sanitary sealing disc in sealed relationship with respect to the upper annular end of the fruit jar.

The cam 13 is then rotated approximately 180 degrees on its pivot 14 to the position shown in Fig. 4 wherein the resilient pressure disc 18 is deflected and applies sealing pressure substantially uniformly to the sanitary sealing disc 16 and virtually crimps the said sanitary sealing disc 16 in sealed relationship over the open end of the fruit jar 12 against the upper annular end 17 thereof. When so sealed, none of the contents from the fruit jar 12 can possibly leak between the threads of the fruit jar cover 10 and the threads of the fruit jar 12 to cause undue sticking of the cover 10 onto the jar 12. Such sticking between the cover 10 and the jar 12 in ordinary threaded fruit jar and cover construction sometimes requires breakage of the fruit jar 12 to permit the cover to be removed therefrom with the consequent loss of contents.

Figure 5:
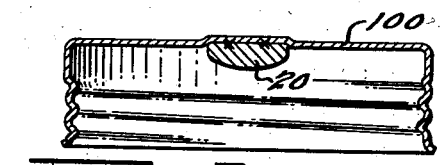
Fig. 5 is a vertical sectional view similar to Fig. 2 showing a wedge means which may be employed to apply pressure to the sanitary sealing disc through the resilient pressure disc.

Referring now particularly to the alternate construction shown in Fig. 5, the threaded fruit jar cover 100 having a central wedge 20 preferably welded or brazed to the inside of the top thereof may be substituted for the cam equipped cover 10 disclosed in Figs. 1 to 4 inclusive. When the threaded wedge equipped cover 100 is turned down on the complementarily threaded end 11 of the fruit jar or the like 12, the wedge 20 will apply sealing pressure to the resilient metal pressure disc 18 whereby to deflect the same and urge the replaceable sanitary sealing disc 16 into substantially uniform sealed relationship over the open end of a fruit jar 12 and against the upper annular end 17 thereof with equal efficacy to that of the cam means 13 employed in the threaded cover 10 to apply sealing pressure onto the replaceable sanitary sealing disc 16 through the resilient metal pressure disc 18.

Although but one embodiment of the invention and one alternate construction have been disclosed and described in detail, it is obvious that many changes may be made in size, shape, arrangement and detail of the various elements of the invention without departing from the spirit thereof, and it is not intended to limit the scope of the invention other than by the terms of the appended claims.

I claim:

1. In combination with a jar having an annular open end with the inner periphery of said end formed to a relatively sharp corner and a cover therefor complementarily formed to admit of the cover being engaged by the periphery of said jar and drawn down over the annular open end thereof, a sanitary sealing disc disposed over the annular end of said jar and a resilient pressure disc disposed over said sealing disc, both discs being disposed within said cover when drawn down over the annular end of said jar, and means carried by said cover for applying concentrated pressure at the center of said pressure disc whereby to flex said sealing disc into sealed relationship with said jar at its upper annular end exerting maximum sealing pressure at the relatively sharp corner of the inner periphery of the said upper annular end of said jar.

2. In combination with a jar having an annular open end with the inner periphery of said end formed to a relatively sharp corner and a cover therefor complementarily formed to admit of the cover being engaged by the periphery of said jar and drawn down over the annular open end thereof, a sanitary sealing disc disposed over the annular end of said jar and a resilient pressure disc disposed over said sealing disc, both discs being disposed within said cover when drawn down over the annular end of said jar, and cam means carried by said cover for applying concentrated pressure at the center of said pressure disc after the said cover is drawn tightly against said pressure disc whereby to flex said sealing disc into sealed relationship with said jar at its upper annular end exerting maximum sealing pressure at the relatively sharp corner of the inner periphery of the said upper annular end of said jar.

3. In combination with a jar having an annular open end with the inner periphery of said end formed to a relatively sharp corner and a cover therefor complementarily formed to admit of the cover being engaged by the periphery of said jar and drawn down over the annular open end thereof, a sanitary sealing disc disposed over the annular end of said jar and a resilient pressure disc disposed over said sealing disc, both discs being disposed within said cover when drawn down over the annular end of said jar, and wedge means disposed between said cover and said pressure disc for applying concentrated pressure at the center of said pressure disc as the said cover is drawn tightly against the said pressure disc whereby to flex said sealing disc into sealed relationship with said jar at its upper annular end exerting maximum sealing pressure at the relatively sharp corner of the inner periphery of the said upper annular end of said jar.

RUDOLF W. ANDREASSON.